May 31, 1960 M. E. BROOKS 2,938,351
FLUID PRESSURE BALANCING VALVE
Filed May 14, 1959 2 Sheets-Sheet 1
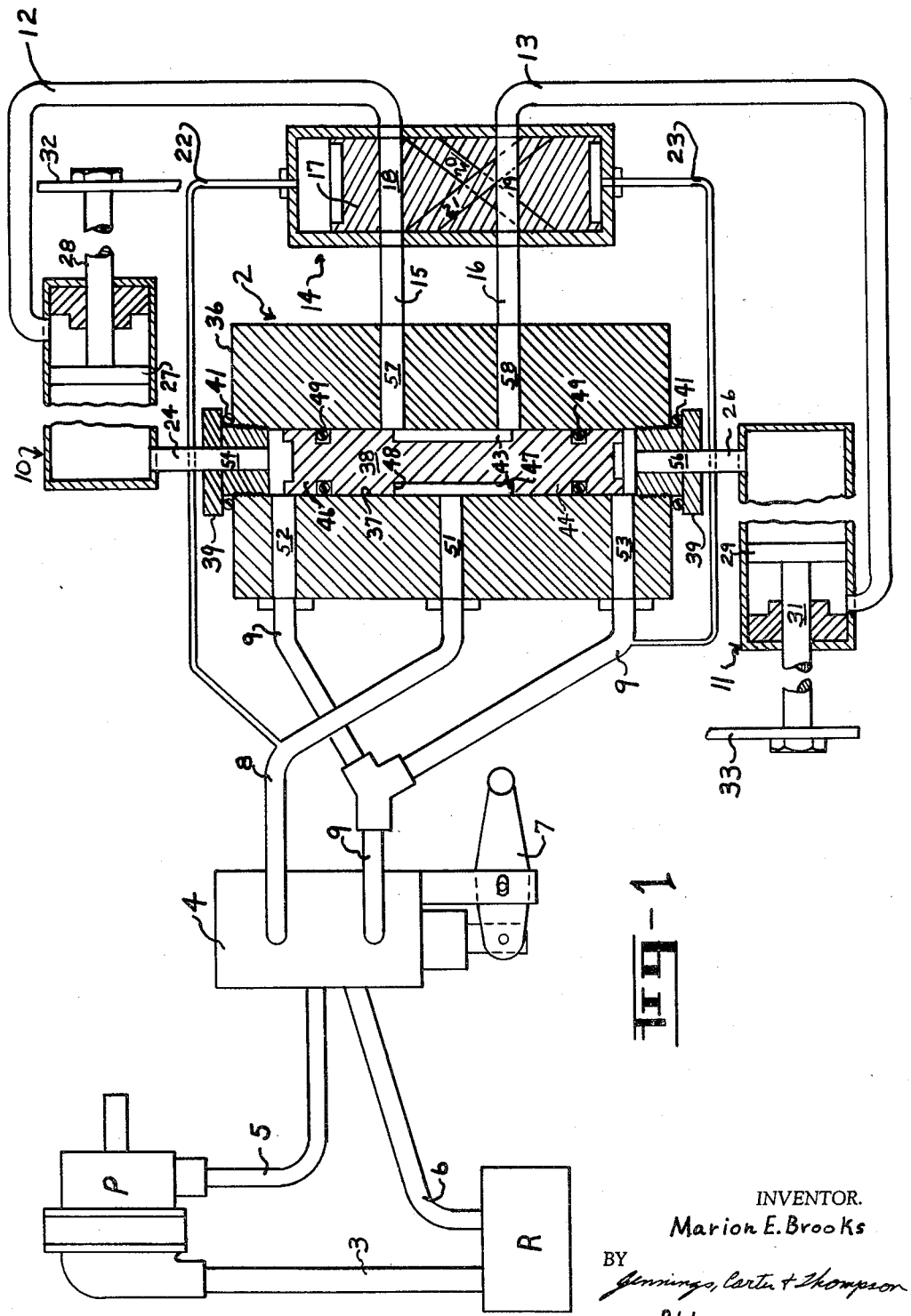
INVENTOR.
Marion E. Brooks
BY
Jennings, Carter & Thompson
Attorneys May 31, 1960  M. E. BROOKS  2,938,351
FLUID PRESSURE BALANCING VALVE
Filed May 14, 1959 2 Sheets-Sheet 2
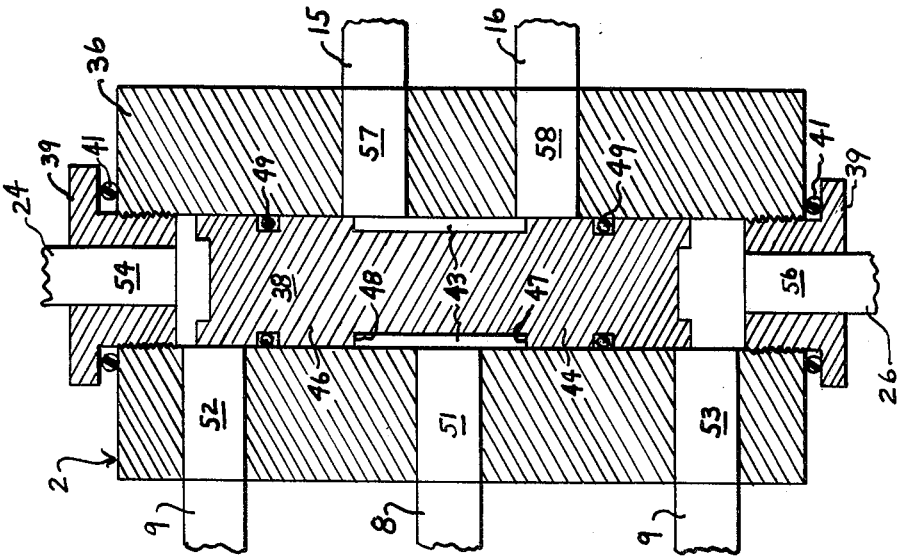
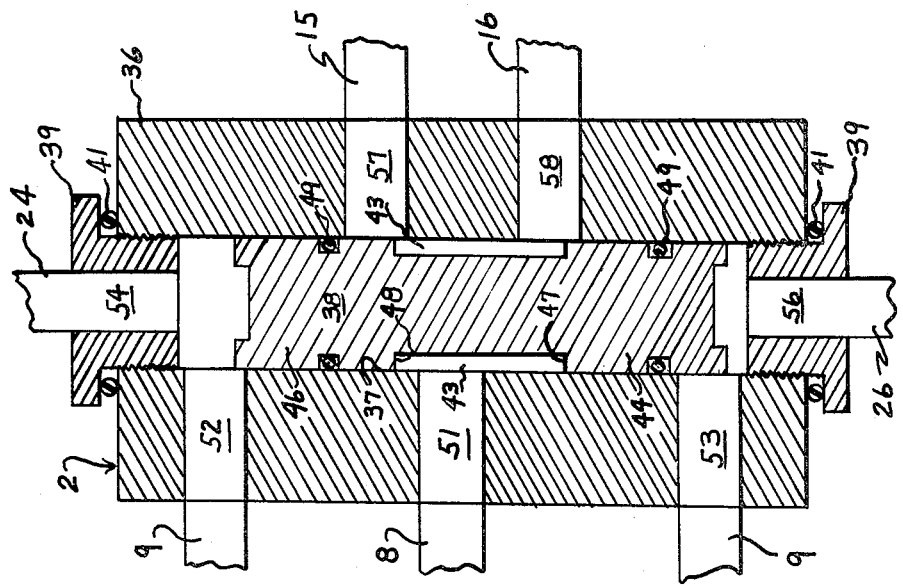
INVENTOR.
Marion E. Brooks
BY
Jennings, Carter & Thompson
Attorneys United States Patent Office 2,938,351
Patented May 31, 1960

2,938,351

FLUID PRESSURE BALANCING VALVE

Marion E. Brooks, Columbus, Ga., assignor to Bickerstaff, Inc., a corporation of Georgia Filed May 14, 1959, Ser. No. 813,151

7 Claims. (Cl. 60—97)

This invention relates to fluid pressure balancing valves and more particularly to such valves arranged to move two working elements in unison even though the loads on the working elements are unbalanced.

A specific use of my pressure balancing valve is on fork lift trucks to operate gripping arms on opposite sides of the truck for gripping or clamping therebetween objects carried by the truck. Heretofore, in the use of clamping arms on lift trucks without any pressure balancing means, if the arm on one side of the truck engaged the object being carried or met resistance before the arm on the other side, the arm having the least resistance would move its full stroke before the other arm moved. This resulted in the load not being centered on the lift truck thereby making it difficult to operate the truck between closely spaced objects as commonly encountered in warehouses and the like.

It is an object of the present invention to provide a valve for equalizing the flow between two load carrying motors so that the working elements thereof move in unison even though the loads on the individual working elements are unequal.

It is a further object of the present invention to provide a fluid pressure balancing valve operatively connected to a pair of side gripping arms on a lift truck so that the two arms move in unison to center the load on the truck even though the load is off-center initially.

Apparatus embodying features of my invention is shown in the accompanying drawings forming a part of my application, in which:

Fig. 1 is a partially diagrammatic view showing my fluid pressure balancing valve in section and connected to a pair of working elements with means to supply fluid to the balancing valve;

Fig. 2 is a sectional view of the fluid pressure balancing valve shown in Fig. 1 with the piston valve thereof in an end position; and, Fig. 3 is a sectional view of the fluid pressure balancing valve shown in Figs. 1 and 2 with the piston valve thereof in an end position opposite from the position shown in Fig. 2.

Referring now to the drawings for a better understanding of my invention and more particularly to Fig. 1, I show a fluid pressure balancing valve indicated generally by the numeral 2. Means to supply fluid to the pressure balancing valve 2 comprise a pump P and a reservoir R. Pump P receives fluid from reservoir R through supply line 3 and supplies fluid to a control valve 4 through supply line 5. A return line 6 returns fluid to reservoir R from valves 2 and 4. Control valve 4 is preferably a common four-way valve and may be actuated through link 7. A suitable lever (not shown) may be connected to link 7 so that the valve 4 may be actuated from the control panel of a lift truck or the like.

Fluid supply line 8 normally supplies fluid to balancing valve 2 from control valve 4 and a return line 9 returns fluid to rseervoir R from valve 2. It is understood that the flow of fluid in lines 8 and 9 may be reversed by actuation of valve 4 through link 7.

Fluid motors in the form of cylinders 10 and 11 are operatively connected to the balancing valve 2 by supply lines 12 and 13. A four-way piston valve indicated generally by numreal 14 is positioned across the supply lines 12 and 13 and is connected to the control valve 2 by lines 15 and 16. A slidable piston 17 in the valve 14 has lateral ports 18 and 19 therethrough which provide fluid communication between lines 15 and 12, and 16 and 13, respectively, in the position shown in Fig. 1. Cross ports 20 and 21 extend through piston 17 and provide fluid communication between lines 15 and 13, and 16 and 12, respectively, upon movement of the piston 17 to the upward position viewed in Fig. 1. A feeder line 22 extends from the supply line 8 to hold the piston 17 in the position shown in Fig. 1 with the fluid being supplied through line 8. When valve 4 is actuated and fluid in lines 8 and 9 is reversed with line 9 becoming the supply line, feeder line 23 shifts valve 17 to its upward position thereby providing the flow of fluid through ports 20 and 21.

Return lines from cylinders 10 and 11 are indicated by the numerals 24 and 26, respectively. Cylinder 10 has a piston 27 therein connected to piston rod 28 and cylinder 11 has a piston 29 therein connected to piston rod 31.

A specific use of my balancing valve is in lift trucks to center the load being carried by the lift or fork truck so that the truck with the load therein may be easily driven between closely spaced objects. Working elements or clamping arms 32 and 33 are partially shown in Fig. 1 and are connected to the ends of piston rods 28 and 31, respectively. Clamping arms 32 and 33 are adapted to clamp or press against the sides of a load, such as a cotton bale, being carried by the lift truck. Thus, on the inward working stroke of cylinders 10 and 11, the arms 32 and 33 move inwardly toward each other to clamp or grip a load on a lift truck positioned therebetween. Fluid is supplied to cylinders 10 and 11 through lines 12 and 13 which are in fluid communication with supply line 8 and arms 32 and 33 thus move inwardly upon fluid being supplied to line 8.

Upon actuation of control valve 4 to reverse the flow in lines 8 and 9, the arms 32 and 33 move outwardly on the non-working stroke thereof. If no pressure balancing means were provided and one of the arms engaged a load or started to move before the other arm, the unengaged arm would move its full stroke before the engaged arm moved. Thus, if a load were not centered on the lift truck initially the clamping arms would not move it and the load would remain uncentered.

Pressure balancing valve 2 provides an arrangement whereby the fluid pressure in cylinders 10 and 11 is substantially balanced at all times by distributing the flow of fluid to and from the cylinders so that the pistons 27 and 29 move in unison in timed relation even though the loads on the cylinders may be unequal. Even through arm 32, for instance, contacts the side of a bale of cotton or the like being carried by a fork truck before arm 33, arm 32 will continue to move at the same rate as arm 33 and the object on the lift truck will be centered thereby.

The fluid pressure balancing valve 2 which accomplishes the above comprises a casing 36 having an axially extending bore 37 extending therethrough. A piston valve 38 is slidably positioned within bore 37. A threaded plug 39 is screwed within each end of bore 37 and a gasket 41 is provided between the head portion of plugs 39 and casing 36 to provide a fluid-tight fitting.

Piston valve 38 comprises a circumferential groove 43 positioned centrally thereof and enlarged end portions 44 and 46 adjacent groove 43. Shoulder 47 is formed by head portion 44 and shoulder 48 is formed by head portion 46 to define circumferential groove 43. O-rings 49 are positioned on the end portions 44 and 46 and provide a fluid seal for piston valve 38 as it slides within bore 37. An inlet port 51 provides fluid communication between supply line 8 and circumferential groove 43. An outlet port 52 is provided to maintain fluid communication between return line 24 and return line 9 through axial bore 37. An outlet port 53 is provided to maintain fluid communication between return line 26 and line 9 through bore 37. An end port 54 provides fluid communication between port 52 and line 24, and end port 56 provides fluid communication between port 53 and line 26.

A lateral port 57 provides fluid communication between supply line 15 and circumferential groove 43. Lateral port 58 provides fluid communication between supply line 16 and circumferential groove 43.

As shown in Fig. 1, valve piston 38 is in a centered position and equal amounts of fluid are directed to cylinders 10 and 11 since ports 57 and 58 receive the same amount of fluid through supply line 8 and the annular opening 43. Also, equal amounts of fluid are being returned by cylinders 10 and 11 to reservoir R as piston valve 38 is positioned centrally of each of outlet ports 52 and 53.

Referring to Fig. 2, piston valve 38 is shown in an end position which is obtained when arm 33 has a load imposed during its inward working stroke that is greater than the load imposed on arm 32 or if arm 32 begins to move before arm 33. When an external load is applied to arm 33, arm 32 continues to move momentarily. An increased fluid pressure is obtained in the piston rod end of cylinder 11 and a decreased fluid pressure is obtained in port 56 when arm 33 has a load imposed thereon and arm 32 continues to move momentarily. This results in the movement of piston valve 38 in the direction indicated in Fig. 2 due to fluid pressure exerted against the end of piston valve 38 through port 54. In this position, the fluid flow to cylinder 11 is increased by enlargement of port 58 while the fluid flow to cylinder 10 is decreased by a decrease in the effective size of port 57. By decreasing the fluid flow to cylinder 10 the fluid pressure in port 54, which is substantially the same as the fluid pressure in the rod end of cylinder 10 since no external load is applied to arm 32, is decreased and piston valve 38 moves only until the fluid pressure in cylinders 10 and 11 is equalized.

The flow of fluid from cylinder 11 through end port 56 and outlet port 53 is decreased in Fig. 2 since the effective size of opening 53 is decreased. The ports 51, 52, 53, 54, 56, 57 and 58 are substantially the same diameter and thus, the effective size of opening 53 varies in reverse proportion to the effective size of opening 52. Likewise, the effective size of lateral port 58 varies in reverse proportion to the effective size of lateral port 57. The fluid pressure is equalized in ports 54 and 56 and cylinders 10 and 11 in the position shown in Fig. 2 and the piston valve 38 floats back and forth depending on the fluid pressure in the closed ends of cylinders 10 and 11 with the pistons 27 and 29 moving in unison in timed relation.

Referring to Fig. 3, piston valve 38 is shown in the other end position in which side arm 32 has a greater load imposed on it in its inward working stroke than does arm 33, or arm 33 moves before arm 32 starts to move. When arm 32 has a load imposed, arm 33 continues to move momentarily and fluid pressure acts against the end of piston valve 38 adjacent port 56 to move the valve 38 in the direction shown in Fig. 3. The flow of fluid through port 57 is increased and the flow of fluid through port 58 is decreased. By decreasing the fluid flow to cylinder 11 and increasing the fluid flow to cylinder 10 which has the load thereon, the fluid pressure is equalized in the closed ends of cylinders 10 and 11 and the pistons move in unison.

In the event the flow through lines 8 and 9 is reversed by actuation of control valve 4 and line 9 becomes the supply line while line 8 becomes the return line to reservoir R, the arms 32 and 33 move outwardly in the non-working stroke. Also, valve 14 is actuated by the flow of fluid through line 23 upon reversing the flow of fluid to move piston 17 to its uppermost position viewing Fig. 1, with line 13 in fluid communication with line 15 through port 21 and line 12 in fluid communication with line 16 through port 20.

Upon a greater load being imposed on arm 33 than arm 32 in the non-working stroke with arm 33 moving outwardly, the flow of fluid through port 53 exerts a pressure against the end of piston 38 tending to move valve 38 initially in the direction shown in Fig. 3. The flow of fluid from cylinder 11 is increased as the effective size of port 57 is increased and the flow of fluid from cylinder 10 is decreased as the effective size of port 58 is decreased. By decreasing the flow of fluid from cylinder 10 the fluid pressure in the rod end thereof builds up which causes the pressure to increase in the closed end of cylinder 10. This exerts a pressure against the end of piston valve 38 to stop the movement thereof when the fluid pressures in the closed ends of cylinders 10 and 11 are equalized. The piston valve 38 shifts back and forth to maintain the equalizing fluid pressure and to allow the arms 32 and 33 to move in unison.

From the foregoing, it is seen that I have provided a fluid pressure balancing valve which may be employed to move a pair of working elements in unison and in timed relation even though unequal loads may be applied against the working elements. This result is accomplished by a slidable piston valve which distributes the flow and pressure between the two cylinders so that an increased flow of fluid is provided to the cylinder having the load imposed thereon. On the working stroke, the flow of fluid from the cylinder having the load imposed is decreased while the flow of fluid from the other cylinder is increased. On the non-working stroke, upon a load imposed on one cylinder, the flow of fluid from the loaded cylinder is increased while the flow of fluid from the other cylinder is decreased to provide an increase in fluid pressure in the closed end of the unloaded cylinder. The piston valve floats back and forth to maintain a substantially equal pressure between the two cylinders which results in the working elements thereof moving in unison. My valve has a variety of uses and one specific use thereof is in fork trucks on which gripping or clamping arms are provided to clamp the object being carried by the fork truck. My arrangement allows the load to be centered on the fork truck in a simple manner.

While I have shown my invention in but one form, it will be obvious to persons skilled in the art that it is not so limited, but is susceptible of various changes and modifications without departing from the spirit thereof, and I desire, therefore, that only such limitations be placed thereupon as are specifically set forth in the appended claims.

What I claim is:

1. In a valve for equalizing the flow of fluid to two motors so that the working elements thereof move in unison, a valve casing having an axial valve bore, a piston valve slidably positioned within said valve bore, a pair of first fluid passageways providing fluid communication between common sides of said motors and opposite ends of said piston valve, a pair of additional fluid passageways providing fluid communication between the other sides of said motors and said piston valve intermediate the piston valve, an inlet port in said casing in fluid communication with said additional fluid passageways, an outlet port in said casing in fluid communication with said first fluid passageways, means supplying fluid to said inlet port to move the working elements of said motors in one direction, and means reversing the flow of fluid through said inlet port and said outlet port to move said working elements in the opposite direction, said piston valve being movable within said bore from a normal centered position establishing substantially equal flow to and from said motors to end positions in which the fluid flow to and from the motors is unequal, said end portions on the working stroke of the motors decreasing the flow of fluid to one motor and increasing in inverse proportion the flow of fluid to the other motor by varying the effective diameters of said first and said additional fluid lines.

2. In a valve for balancing the fluid pressure between two motors so that the working elements thereof move in unison, a valve casing having an axial valve bore, a piston valve slidably positioned within said valve bore, first fluid passageways providing fluid communication between one side of said motors and opposite ends of said piston valve, additional fluid passageways providing fluid communication between the other side of said motors and said piston valve intermediately of the piston valve, an inlet port in said casing in fluid communication with said additional fluid passageways, an outlet port in said casing in fluid communication with said first fluid passageways, means supplying fluid to said inlet port to move the working elements of said motors in one direction, means reversing the flow of fluid through said inlet port and said outlet port to move said working elements in the opposite direction, said piston valve being movable within said bore between a normal centered position and opposite end positions, said centered position establishing substantially equal flow through said first fluid passageways and said additional fluid passageways, said end positions on the working stroke of the motors decreasing the fluid flow to one motor and increasing the flow therefrom in inverse proportion to said decreased fluid flow, the fluid flow to the other cylinder being increased and the fluid flow therefrom being decreased in inverse proportion to said increased fluid flow, and the shifting of said piston valve from the centered position being effected upon one of said motors having a greater load thereon than the load on the other motor which is transmitted to said piston valve for shifting same and equalizing the fluid pressure in said motors.

3. In a valve for balancing the fluid pressure between two load carrying reciprocating motors each comprising a piston and a cylinder so that the pistons thereof move in unison, a valve casing having an axial valve bore, a piston valve slidably positioned within said valve bore, a port adjacent each end of the piston valve and in communication therewith, one end port in fluid communication with an end of one cylinder and the other end port in fluid communication with an end of the other cylinder, a pair of lateral ports through said casing in fluid communication adjacent one end with said piston valve and in fluid communication adjacent the other end with the other ends of said cylinders, an inlet port in said casing adjacent the piston valve and in fluid communication with said lateral ports, an outlet port communicating with the end ports adjacent the ends of the piston valve, said piston valve being movable within said bore from a normal centered position establishing substantially equal flow to and from said cylinders to end positions in which the fluid flow to and from the cylinders is unequal, means supplying fluid to said inlet port to move the pistons on the working strokes, and means reversing the flow of fluid through the inlet port and said outlet port to move the pistons on the non-working strokes, the shifting of the piston valve from the normal centered position to an end position on the working stroke being effected upon one of the load carrying motors having a greater load imposed thereon than the load on the other motor whereby the flow of fluid to said motor having the greater load thereon is increased while the flow of fluid to the motor having the lesser load is decreased to equalize the fluid pressure between the two load carrying motors.

4. In a valve for balancing the fluid pressure between two load carrying reciprocating motors each comprising a cylinder and a piston so that the pistons thereof move in unison, a valve casing having an axial valve bore, a piston valve slidably positioned within said valve bore, a port adjacent each end of the piston valve and in fluid communication therewith, one end port in fluid communication with an end of one cylinder and the other end port in fluid communication with an end of the other cylinder, a pair of lateral ports in said casing in fluid communication adjacent one end with said piston valve, a pair of fluid lines connecting the other ends of said lateral ports with the other ends of said cylinders, an inlet port in said casing adjacent the piston valve and in fluid communication with said lateral ports, an outlet port communicating with the end ports adjacent the ends of the piston valve, means supplying fluid to said inlet port to move the piston of said cylinders in one direction, means reversing the flow of fluid through said inlet port and said outlet port to move said pistons in the opposite direction, said piston valve having an annular groove intermediate thereof and enlarged end portions adjacent the groove extending to the end ports to restrict the flow of fluid through said end ports, said annular groove providing fluid communication between said inlet port and said lateral ports with the head portions restricting flow through said lateral ports, the movement of the piston valve from the normal centered position to the end positions on the working stroke of the pistons being effected upon one of the motors having a greater load imposed thereon than the load on the other motor, the shifting of the piston valve to an end position on the working stroke of the pistons increasing the flow of fluid through one of the lateral ports of the motor having the greater load imposed thereon and decreasing the flow of fluid through the other of the lateral ports to the other motor correspondingly, whereby fluid pressure between the two motors adjacent the end ports is equalized and a uniform movement of the pistons is obtained.

5. In a valve for balancing the fluid pressure between two fluid motors so that the working elements thereof move together in unison, a valve casing having an axial valve bore, a piston valve slidably positioned within said valve bore and movable between a centered position and end positions, a port adjacent each end of the piston valve and in fluid communication therewith, one end port in fluid communication with one motor and the other end port in fluid communication with the other motor, a pair of lateral ports in said casing in fluid communication adjacent one side with said piston valve and in fluid communication adjacent the other side with the motors, an inlet port in said casing adjacent the piston valve and in fluid communication with said lateral ports, an outlet port communicating with the end ports adjacent the ends of the piston valve, said piston valve establishing substantially equal flow to and from said motors in said centered position, means supplying fluid to said inlet port to move the working elements of said motors in one direction, means reversing the flow of fluid through said inlet port and said outlet port to move said working elements in the opposite direction, the movement of the piston valve from the normal centered position to the end positions being effected upon one of the motors having a greater load imposed thereon than the load on the other motor, and the flow of fluid to the motor having the greater load thereon being increased through movement of the piston valve while the flow of fluid to the motor having the lesser load is decreased correspondingly to equalize the fluid pressure between the two motors and to provide a uniform movement of the working elements.

6. In a valve for balancing the fluid pressure between two motors each comprising a cylinder and a piston so that the pistons thereof move in unison, a valve casing having an axial valve bore, a piston valve slidably positioned within said valve bore, a port adjacent each end of the piston valve and in fluid communication therewith, one of the end ports in fluid communication with one end of one cylinder and the other end port in fluid communication with one end of the second cylinder, a pair of lateral ports in said casing adjacent the piston valve, one of said lateral ports being in fluid communication with the other end of said one cylinder and the other of said lateral ports being in fluid communication with the other end of said second cylinder, an inlet port in said casing adjacent the piston valve and in fluid communication with said lateral ports, an outlet port communicating with the end ports adjacent the ends of the piston valve, said piston valve being movable within said bore between a normal centered position and end positions, said centered position establishing substantially equal flow through said lateral ports to said cylinders and through said end ports from said cylinders, said end positions decreasing the fluid flow through one lateral port on the working stroke of the pistons and increasing the fluid flow through the other lateral port in inverse proportion to said decreased fluid flow, the fluid flow through one end port in said end positions being decreased on the working stroke of the pistons upon shifting of said piston valve from the centered position and the fluid flow through the other end port being increased in inverse proportion to said decreased flow, and the shifting of said piston valve from the normal centered position being effected upon one of said load carrying motors having a greater load thereon than the load on the other load carrying motor which is transmitted to said piston valve to shift said piston valve and thereby equalize the fluid pressure in said motors.

7. The fluid valve defined in claim 4 in which a control valve is operatively connected to said pair of fluid lines and connects said lateral ports with alternate cylinders upon actuation of said means reversing the flow of fluid.

References Cited in the file of this patent

UNITED STATES PATENTS

| | | |
|---|---|---|
| 1,999,834 | Ernst | Apr. 30, 1935 |
| 2,571,550 | Ehmann | Oct. 16, 1951 |

FOREIGN PATENTS

| | | |
|---|---|---|
| 1,112,202 | France | Nov. 9, 1955 |